US012792318B2

(12) United States Patent
Vasseur et al.

(10) Patent No.: US 12,792,318 B2

(45) Date of Patent: Nov. 10, 2026

(54) AUTOMATIC CURATION OF REUSABLE CODE SNIPPETS FOR LLM AGENTS

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL); Petar Stupar, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 18/588,113

(22) Filed: Feb. 27, 2024

(65) Prior Publication Data

US 2025/0272070 A1 Aug. 28, 2025

(51) Int. Cl.
*G06F 8/36* (2018.01)

(52) U.S. Cl.
CPC .................................... *G06F 8/36* (2013.01)

(58) Field of Classification Search
CPC ................................ G06F 8/36; G06N 20/20
USPC .......................................................... 717/106
See application file for complete search history.

(56) References Cited

U.S. PATENT DOCUMENTS 5,386,556 A * 1/1995 Hedin ............... G06F 16/24522
12,242,433 B2 * 3/2025 Gottlob ................ G06F 16/211
12,475,086 B2 * 11/2025 Gottlob ................ G06F 16/211
2020/0097266 A1 3/2020 Lodhia et al.
2020/0265060 A1 * 8/2020 Crapo ..................... G06N 3/044
2021/0081182 A1 3/2021 Seshadri et al.
2023/0259705 A1 * 8/2023 Tunstall-Pedoe .... G06N 3/0499 704/9
2024/0020096 A1 * 1/2024 Chen ....................... G06F 40/30
2024/0406166 A1 * 12/2024 Bell .................... G06F 16/3329
2025/0045256 A1 * 2/2025 Gottlob ............... G06F 16/2365

FOREIGN PATENT DOCUMENTS

CN 109508191 A 3/2019
CN 116795427 A 9/2023

OTHER PUBLICATIONS

Qian, Chen, et al. "Communicative agents for software development." arXiv preprint arXiv:2307.07924 6.3 (2023): pp. 1-29. (Year: 2023).*

(Continued)

*Primary Examiner* — Satish Rampuria
(74) *Attorney, Agent, or Firm* — Lee & Hayes, P.C.

(57) ABSTRACT

In one embodiment, a method herein may comprise: storing code-based functions in a database that is accessible to large language model agents for coding, wherein the code-based functions are associated with traces each relating to a respective question and a respective list of sequential code-based functions used to answer the respective question by a past agent run; determining one or more sequential groupings of the code-based functions that are candidates for corresponding reduction into a merged function; determining whether the merged function is acceptable; and adding, responsive to the merged function being acceptable, the merged function to the database of the code-based functions that are accessible to the large language model agents for coding.

19 Claims, 12 Drawing Sheets

(56) References Cited

OTHER PUBLICATIONS

Babaei Giglou, Hamed, Jennifer D'Souza, and Sören Auer. "LLMs4OL: Large language models for ontology learning." International Semantic Web Conference. Cham: Springer Nature Switzerland, 2023. pp. 2-27. (Year: 2023).*
Wan, Zhongwei, et al. "Efficient large language models: A survey." arXiv preprint arXiv:2312.03863 (2023). pp. 1-67 (Year: 2023).*
Li, Chenliang, et al. "Modelscope-agent: Building your customizable agent system with open-source large language models." Proceedings of the 2023 Conference on Empirical Methods in Natural Language Processing: System Demonstrations. 2023. pp. 566-578. (Year: 2023).*
Babaei Giglou, Hamed, Jennifer D'Souza, and Sören Auer. "LLMs4OL: Large language models for ontology learning." International semantic web conference. Cham: Springer Nature Switzerland, 2023. pp. 1-27. (Year: 2023).*
Ghimire, Prashnna, Kyungki Kim, and Manoj Acharya. "Generative ai in the construction industry: Opportunities & challenges." arXiv preprint arXiv:2310.04427 (2023). pp. 1-30. (Year: 2023).*
Reid B., "Improving Developer Efficiency through Code Reuse", The University of Adelaide, Nov. 7, 2023, 148 Pages.

* cited by examiner

500

QUESTION: IS THERE A CORRELATION BETWEEN THE TRAFFIC UTILIZATION ON THE UPSTREAM INTERFACE AND THE TX UTILIZATION FOR RADIO SLOT 1 ON MY DNAC AP SJC-05-03?
FINAL ANSWER: YES, THERE IS A STRONG CORRELATION BETWEEN THOSE VARIABLES (0.92).
TIMESTAMP: 2023-01-01 04:50:00
STEPS:
DESCRIPTION: LOOK UP THE AP DEVICE'S MAC ADDRESS
CODE:

```
device_mac = (
  [
     entry["macAddress"]
     for entry in dnac.devices.get_device_list()
     if "SJC-05-03" in entry["hostname"]
  ].pop().upper()
)
```

FIG. 5A

500

```
DESCRIPTION: GET RF METRICS FROM THE DEVICE
CODE:
rf_metrics = (
  pl.from_dicts(
     dnac.assurance.ap_rf_metrics(
        mac_address=device_mac, slot=1
     )
  )
  .select("timeMs", "txUtil")
  .join(
     pl.from_dicts(
            dnac.assurance.ap_link_agg_metrics(
             mac_address=device_mac,
          )
        )
        .select("time", "totalUtilization"),
      on="time")
)
DESCRIPTION: COMPUTE CORRELATION
CODE:
corr = rf_metrics.select(pl.corr("totalUtilization", "txUtil"))
```

FIG. 5B

AUTOMATIC CURATION OF REUSABLE CODE SNIPPETS FOR LLM AGENTS

TECHNICAL FIELD

The present disclosure relates generally to computer networks, and, more particularly, to the automatic curation of reusable code snippets for large language model (LLM) agents.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

LLM agents, in particular, can be built by exposing tools that interact with various network controller APIs. In particular, LLMs can be directed to write code that uses software developer kits (SDKs) for the network controller APIs. For example, an agent prompted to respond to the request: "Get the health of the controller user 'johnd' is connected to", may write a corresponding code (e.g., in Python) to fetch the information from the relevant network controller and answer the question. While such agents may be able to successfully make the correct inferences, manual supervision is often required to filter extraneous data. Moreover, even successful answers may require a sequence of steps that may not always be performed correctly, and/or may be slow and unreliable. Still further, some code snippets may look fine and have no inherent errors or exceptions, but they may actually be incorrect. In such cases, the agent can confidently produce an incorrect result.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate an example trace generated in response to a question input to a large language model (LLM);

DESCRIPTION OF EXAMPLE EMBODIMENTS

Overview

According to one or more embodiments of the disclosure, a method herein may comprise: storing code-based functions in a database that is accessible to large language model agents for coding, wherein the code-based functions are associated with traces each relating to a respective question and a respective list of sequential code-based functions used to answer the respective question by a past agent run; determining one or more sequential groupings of the code-based functions that are candidates for corresponding reduction into a merged function; determining whether the merged function is acceptable; and adding, responsive to the merged function being acceptable, the merged function to the database of the code-based functions that are accessible to the large language model agents for coding.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
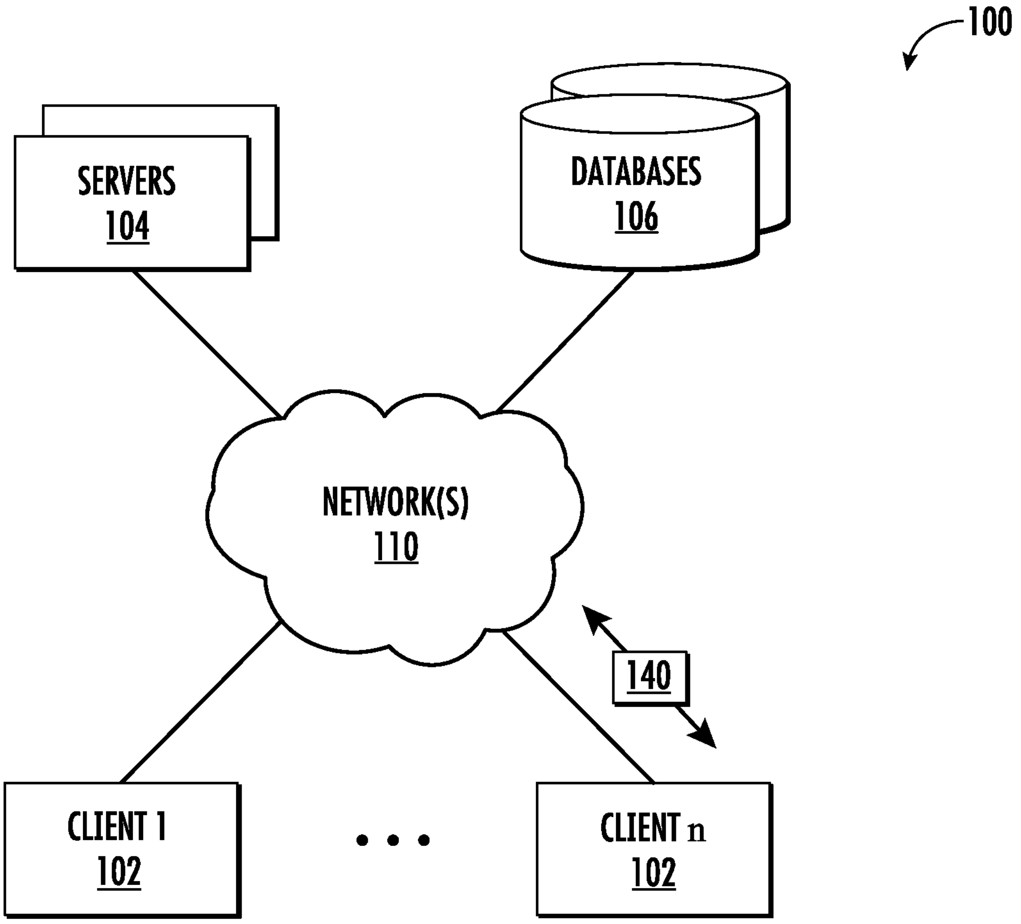
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
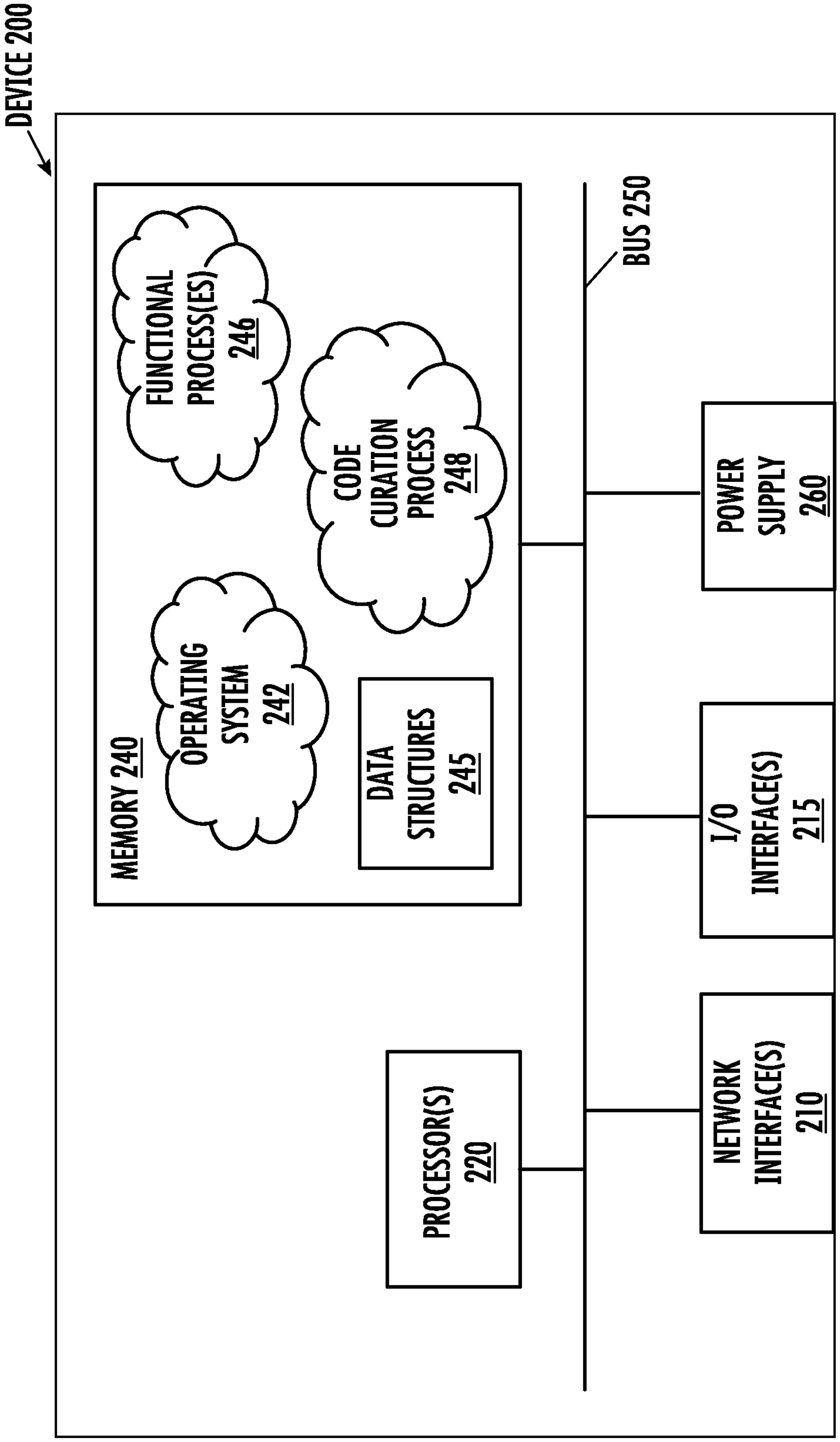
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a code curation process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

For instance, one or more functional processes 246 may include computer executable instructions executed by the processor(s) 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, the one or more functional processes 246 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, one or more functional processes 246 and/or code curation process (process 248) may include computer executable instructions that, when executed by processor(s) 220, cause device 200 to perform the techniques described herein. To do so, in some implementations, one or more functional processes 246 and/or process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, one or more functional processes 246 and/or process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that one or more functional processes 246 and/or process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, one or more functional processes 246 and/or process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, one or more functional processes 246 and/or process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, one or more functional processes 246 and/or process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
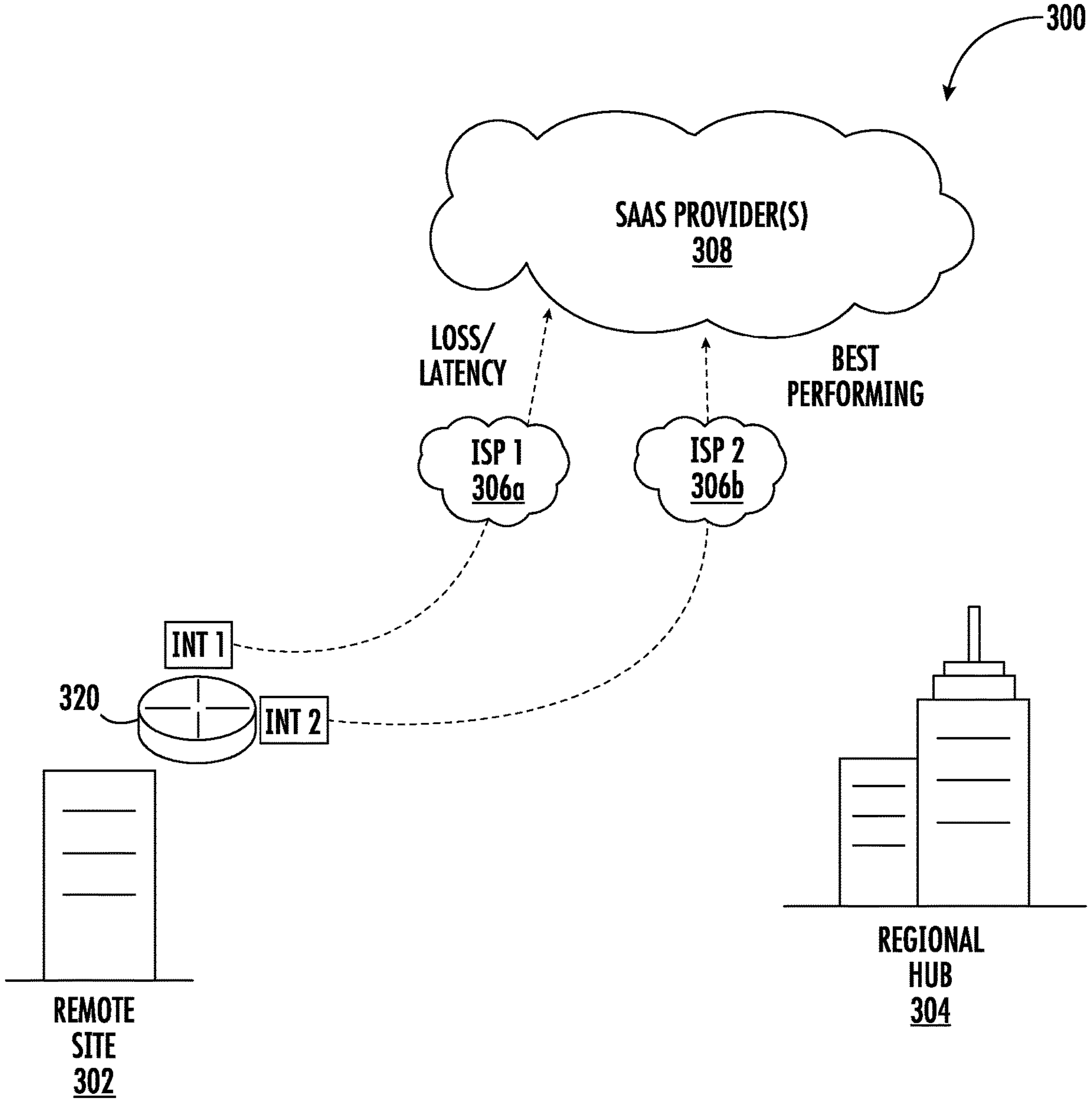
FIGS. 3A-3B illustrate example network deployments.
Figure 3B:
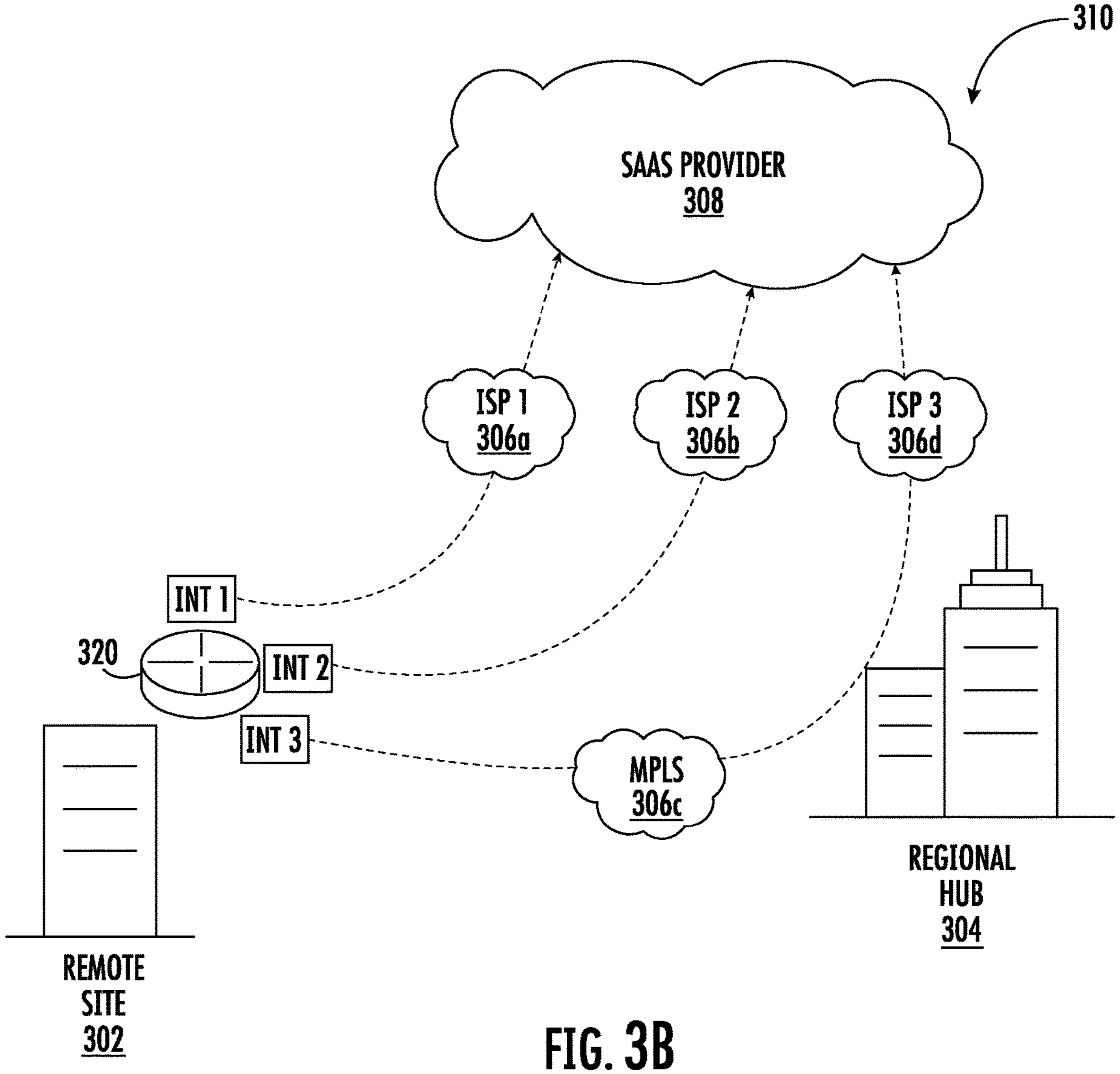

FIGS. 3A-3B illustrate example network deployments (network deployment 300, network deployment 310, respectively). As shown, a router 320 located at the edge of a remote site 302 may provide connectivity between a local area network (LAN) of the remote site 302 and one or more cloud-based, SaaS provider(s) 308. For example, in the case of an SD-WAN, router 320 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and a SaaS provider. For example, as shown in network deployment 300 in FIG. 3A, router 320 may utilize two Direct Internet Access (DIA) connections to connect with SaaS provider(s) 308. More specifically, a first interface of router 320 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 320, Int 2, may establish a backhaul path with SaaS provider(s) 308 via a second ISP 306*b*, denoted ISP 2 in FIG. 3A.

FIG. 3B illustrates another network deployment 310 in which Int 1 of router 320 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 320 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Figure 4:
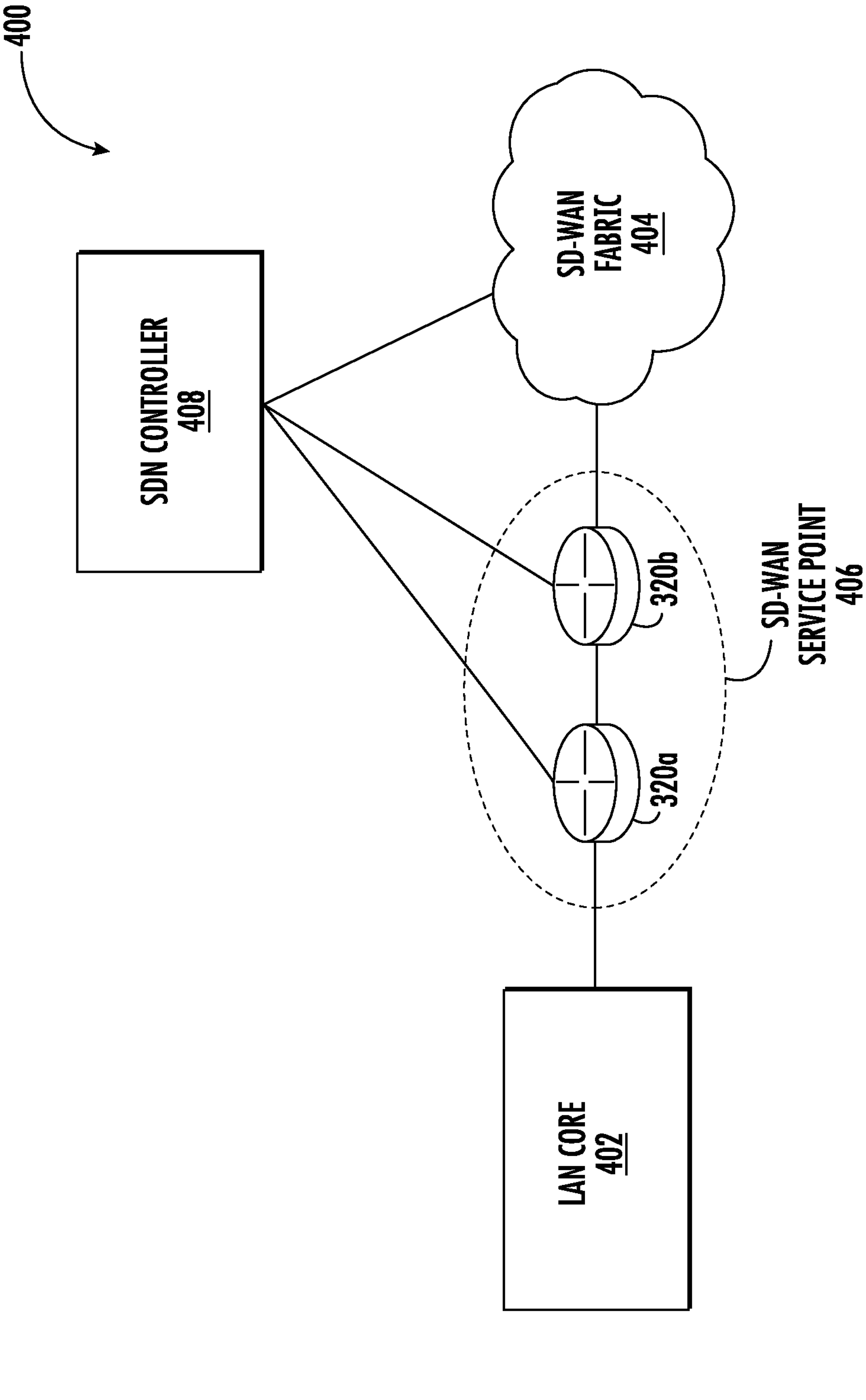
FIG. 4 illustrates an example software defined network (SDN) implementation.

Regardless of the specific connectivity configuration for the network, a variety of access technologies may be used (e.g., ADSL, 4G, 5G, etc.) in all cases, as well as various networking technologies (e.g., public Internet, MPLS (with or without strict SL A), etc.) to connect the LAN of remote site 302 to SaaS provider(s) 308. Other deployments scenarios are also possible, such as using Colo, accessing SaaS provider(s) 308 via Zscaler or Umbrella services, and the like, FIG. 4 illustrates an example SDN implementation 400, according to various implementations. As shown, there may be a LAN core 402 at a particular location, such as remote site 302 shown previously in FIGS. 3A-3B, Connected to LAN core 402 may be one or more routers that form an SD-WAN service point 406 which provides connectivity between LAN core 402 and SD-WAN fabric 404. For instance, SD-WAN service point 406 may comprise routers 320*a*-320*b*.

Overseeing the operations of routers 320*a*-320*b* in SD-WAN service point 406 and SD-WAN fabric 404 may be an SDN controller 408. In general, SDN controller 408 may comprise one or more devices (e.g., a device 200) configured to provide a supervisory service (e.g., one or more functional processes 246), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high, Millions of paths across thousands of Service Providers (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network, DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance. SDN controller 408 may make use of a high volume of network and application telemetry (e.g., from routers 320*a*-320*b*, SD-WAN fabric 404, etc.) so as to compute statistical and/or machine learning models to control the network with the objective of optimizing the application experience and reducing potential down times. To that end. SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

—Automatic Curation of Reusable Code Snippets—

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, Digital Network Architecture Controller (DNAC) from Cisco Systems, Inc., Application Centric Infrastructure (ACI) from Cisco Systems, Inc., etc.). Moreover, network issues can manifest in various forms, stemming from a multitude of factors, each with its own level of complexity.

As also noted above, agents can be written to perform complex tasks, such as LLM-based troubleshooting and monitoring (LTM), by chaining multiple calls to one or more LLMs. Such agents can be built, for example, by exposing tools that interact with various network controller application programming interfaces (APIs) or libraries. For instance, one simple way to build an LLM-based network troubleshooting agent is to prompt GPT-4 with some description of the problem and some instruction(s) to solve the problem. More elaborate approaches might include allowing the model to write code write code that uses software developer kits (SDKs) for the network controller APIs (e.g., DNA Center SDK, the Meraki Dashboard API Library, or custom generated SDKs for other APIs described through an OpenAPI specification). For example, as mentioned above, an agent prompted to respond to the request: "Get the health of the DNAC device user 'johnd' is connected to", may write the following Python code to fetch the information from the relevant network controller and answer the question:

```
import pandas as pd
user_info=client.general.user_info_from_username
    (username="johnd")
device_id=user_info["device_id" ]
device_health_data=client.dnac.devices.devices( )
device_health_df=pd.json_normalize(device_
    health_data)
device_health=device_health_df[
    device_health_df["name"]==device_id
].reset_index( )["overallHealth"][0]
print(device_health)
```

In this code fragment example, the model successfully inferred that the device ID needs to be retrieved first. Then, the model successfully called the 'devices' method on the DNAC controller SDK client, which takes no argument and requires that the caller manually filters out the output to get the data for a particular device ID.

Although the model was successful, the answer required that it performed a sequence of steps (e.g., retrieve the data via SDK, perform multiple filtering actions, extract the health score) which it may not always perform correctly. In addition, it can take some time for the model to come up with all the steps (e.g., writing the code may need to be broken down into multiple LLM calls, for example with different queries used to look up available methods on the SDK client to use for retrieval-augmented generation). In more complex examples, there may be a handful or more of steps, which can be slow and not work reliably.

Moreover, some code snippets may look fine at first glance and not raise any kind of error or exception but may actually be incorrect. For example, using the DNAC SDK method client.dnac.devices.devices(device_id=device_id) with an argument will not produce an error, but will silently ignore the device ID argument and return a complete list of devices present in the system. This can lead to incorrect results if the output is not then filtered by required device ID. In such cases, the agent can confidently produce an incorrect result. Such "gotchas" can be difficult to identify automatically without supervision from a subject matter expert to help review either the use of the controller APIs, or the results produced by the agent.

The techniques herein, therefore, provide for automatic curation of reusable code snippets for LLM agents (e.g., troubleshooting agents). In particular, the techniques herein introduce a method that automatically builds reusable and reliable code snippets from past runs from LLM agents (e.g., troubleshooting and monitoring agents), such as by grouping multiple steps together with the goal of improving the speed and reliability of LLM agents solving complex tasks (e.g., complex network troubleshooting and monitoring tasks). As described in greater detail below, the techniques leverage logs from previous agent runs, both successful and failed, as there is information to be gleaned from both. The candidate code snippets may both be tested automatically and reviewed by subject matter experts in a rich review interface that provides ample context. The reviewed code snippets may then be then added to the base of available SDK methods for use by an agent. The agent can either use them when writing code, or it can directly call some of the snippets as a tool. Finally, existing code snippets may be periodically reviewed for usefulness and accuracy in a similar fashion. Accordingly, the techniques herein allows to produce agents that improve with time, both in speed and reliability, by combining the best traits from automatic generation and manual expert review.

Specifically, according to one or more embodiments of the disclosure as described in detail below, a method herein may comprise: storing code-based functions in a database that is accessible to large language model agents for coding, wherein the code-based functions are associated with traces each relating to a respective question and a respective list of sequential code-based functions used to answer the respective question by a past agent run; determining one or more sequential groupings of the code-based functions that are candidates for corresponding reduction into a merged function; determining whether the merged function is acceptable; and adding, responsive to the merged function being acceptable, the merged function to the database of the code-based functions that are accessible to the large language model agents for coding.

Notably, the present disclosure assumes an existing LLM agent that takes questions as input, runs one or more steps that can consist in calling a large language model (LLM) or retrieve data from external systems, and produces an answer as output. In particular, the agent relies on external APIs to obtain data required to answer the questions. In the description below, the agent is assumed to write Python code and call APIs through an SDK client library, although other ways work equally well, as will be appreciated by those skilled in the art.

The LLM agent produces logs for each run, whether from a real user question, or a generated scenario question using various generation techniques. The logs are referred to as "traces". A "trace" consists in some metadata about the question, along with a detailed list of steps that the agent took to answer the question.

FIGS. 5A-5B illustrate an example trace 500 generated in response to a question input to an LLM. In particular, as shown:

Question: Is there a correlation between the traffic utilization on the upstream interface and the TX utilization for radio slot 1 on my DNAC AP SJC-05-03?

Final Answer: Yes, there is a strong correlation between those variables (0.92).

Timestamp: 2023-01-01 04:50:00

Steps:

Description: Look up the AP device's MAC address

Code:

```
device_mac = (
  [
    entry ["macAddress"]
    for entry in dnac.devices.get_device_list( )
    if "SJC-05-03" in entry["hostname"]
  ].pop( ).upper( )
)
Description: Get RF metrics from the device
Code:
rf_metrics = (
  pl.from_dicts(
    dnac.assurance.ap_rf_metrics(
      mac_address=device_mac, slot=1
    )
  )
  .select("timeMs", "txUtil")
  .join(
    pl.from_dicts(
        dnac.assurance.ap_link_agg_metrics(
        mac_address=device_mac,
```

-continued

```
            )
          )
          .select("time", "totalUtilization"),
        on="time")
      )
```

Description: compute correlation

Code:

corr=rf_metrics.select(pl.corr("totalUtilization", "txUtil"))

Figure 6:
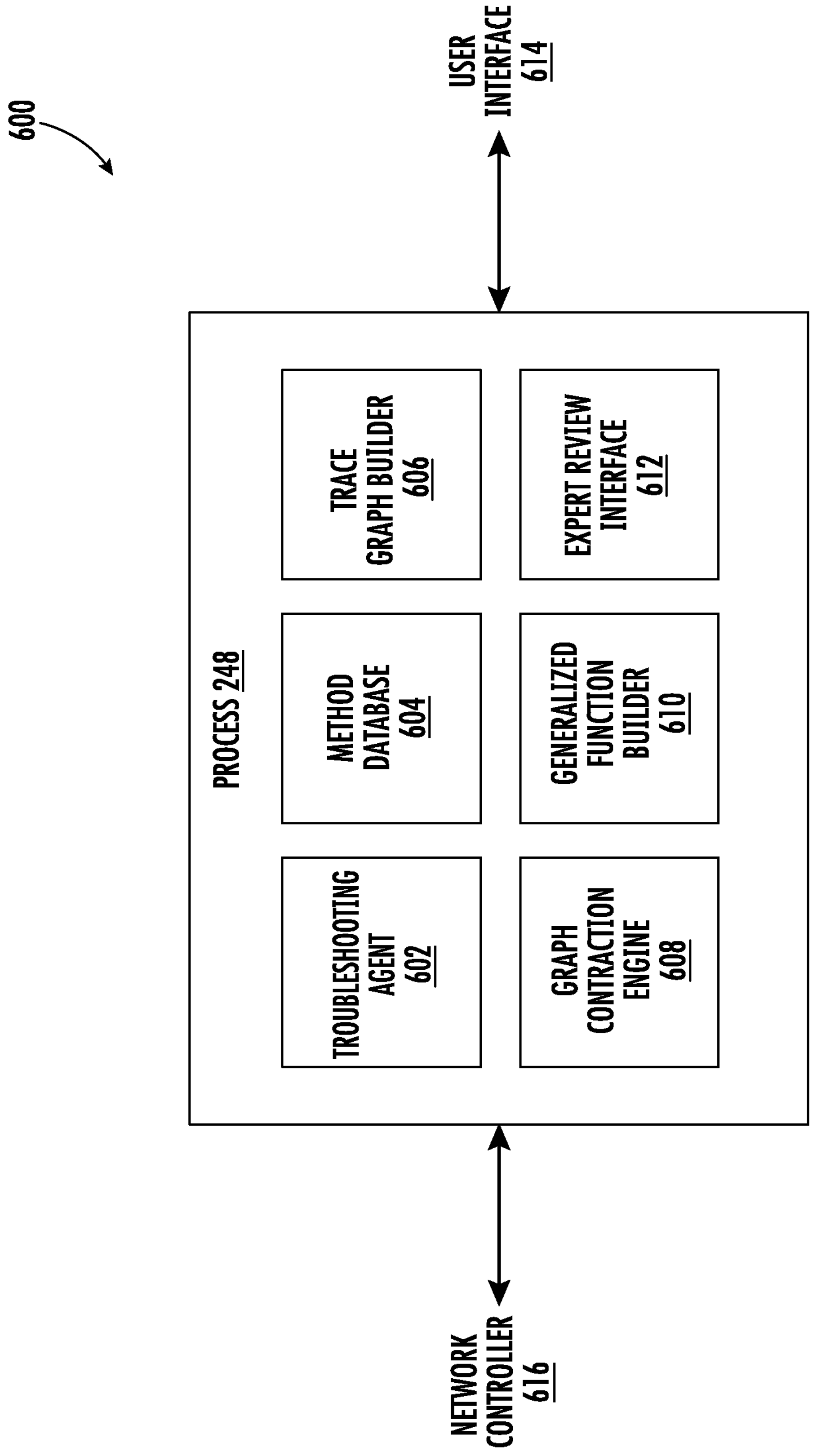
FIG. 6 illustrates an example architecture for automatic curation of reusable code snippets for LLM agents.

FIG. 6 illustrates an example architecture (architecture 600) for automatic curation of reusable code snippets for LLM agents, according to various implementations herein. At the core of architecture 600 is code curation process (process 248), which may be executed by a controller for a network or another device in communication therewith. For instance, the code curation process may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, the code curation process (process 248) may interface with a network controller 616, either locally or via a network, such as via one or more application programming interfaces (APIs), etc. In addition, the code curation process may communicate with any number of user interfaces, such as user interface 614.

As shown, the code curation process (process 248) may include any or all of the following components: a troubleshooting agent 602, method database 604, trace graph builder 606, graph contraction engine 608, generalized function builder 610, and expert review interface 612. As would be appreciated, the functionalities of these components (e.g., modules, processes, etc.) may be combined or omitted, as desired. In addition, these components may be implemented on a singular device or in a distributed manner, in which case the combination of executing devices can be viewed as their own singular device for purposes of executing the code curation process (process 248).

According to various implementations, troubleshooting agent 602 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 602, statically determined according to a cookbook for each trajectory made of a set of action ai, or the like. For example, a static cookbook may be used to map a specific ak to set of actions Ak,1. Consider the action ak="Check the priority queue length of a router," a static set of action ak,1 may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 602 for issue I is eligible for automated action (e.g., according to a policy), troubleshooting agent 602 may perform any or all of the following:

- Troubleshooting agent 602 retrieves the set of action Ai for the root cause of issue I after activating a timer T (max time to solve the issue)
- Troubleshooting agent 602 may also employ various optimization criterion may be used for solving a given task T. For instance, troubleshooting agent 602 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 602 may trigger multiple actions in parallel, each with different optimization criterion. For example, for a given issue I, troubleshooting agent 602 may send a request to a first LLM with a first criteria (e.g., solve as quickly as possible, optimizing time) and send the same request to a second LLM with different optimization criteria (e.g., efficiency). In such a case, troubleshooting agent 602 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 602 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

Operationally, the first component of the techniques herein is the method database 604, or "MD". The MD stores all methods used to interact with controllers that are accessible to the agent when writing code. The MD can be seeded with basic SDK methods corresponding to built-in API endpoints for the controllers. As the techniques herein are run over time, new methods that have been automatically generated will be added to the MD. The troubleshooting agent 602 integrates with the MD directly.

The second component herein is the trace graph builder 606, or "TGB". The TGB builds a directed graph that summarizes how all existing methods in the MD have been used by past traces. The graph is constructed as follows:

- Nodes of the graph consists of questions, methods, and final answers.
- Edges track the flow of the agent run. If method A was used then B, then there will be an edge from A to B. Edges are weighted, and the weight is the number of traces going through the edge.

The graph can be filtered to obtain either all traces, only successful traces, or only failed traces.

Figure 7:
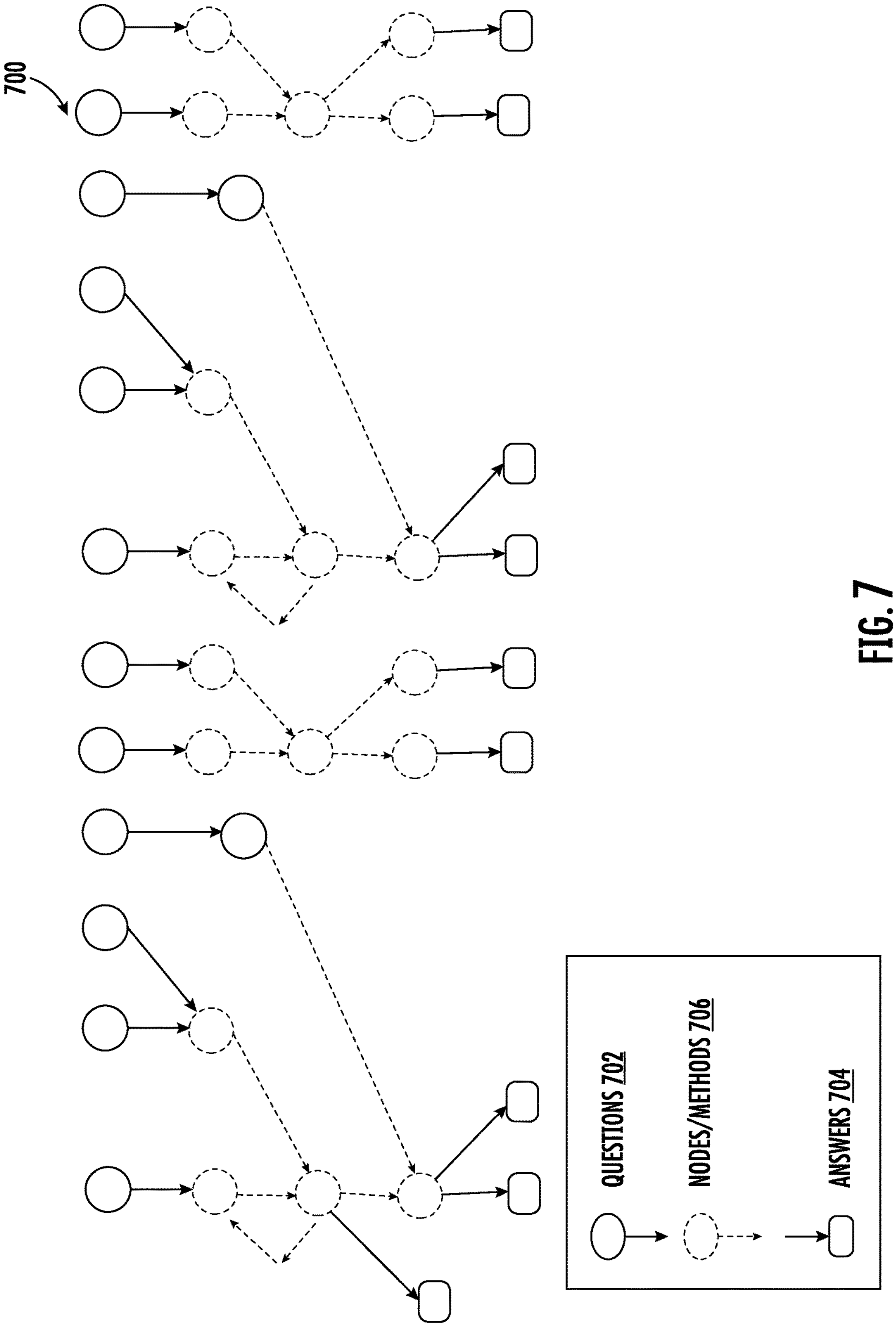
FIG. 7 illustrates a sample graph with questions, final answers, and methods called by an agent in accordance with one or more aspects of the techniques herein.

FIG. 7, in particular, illustrates a sample graph 700 with questions 702, final answers 704, and other nodes 706 which are methods called by an agent in accordance with one or more aspects of the techniques herein.

The third component herein is the graph contraction engine 608, or "GCE". The GCE produces candidate groupings of existing method nodes into a single node. Multiple techniques can be used to generate such candidates.

In one embodiment, small chains with high edge weight can be identified in the graph as follows:

- Define a "degree 2 node" as a method node that has exactly one inbound edge and exactly one outbound edge.
- Make a pass over the graph and merge any two connected degree 2 nodes.
- Iterate until there are no more pairs of degree 2 nodes connected with an edge.

Figure 8:
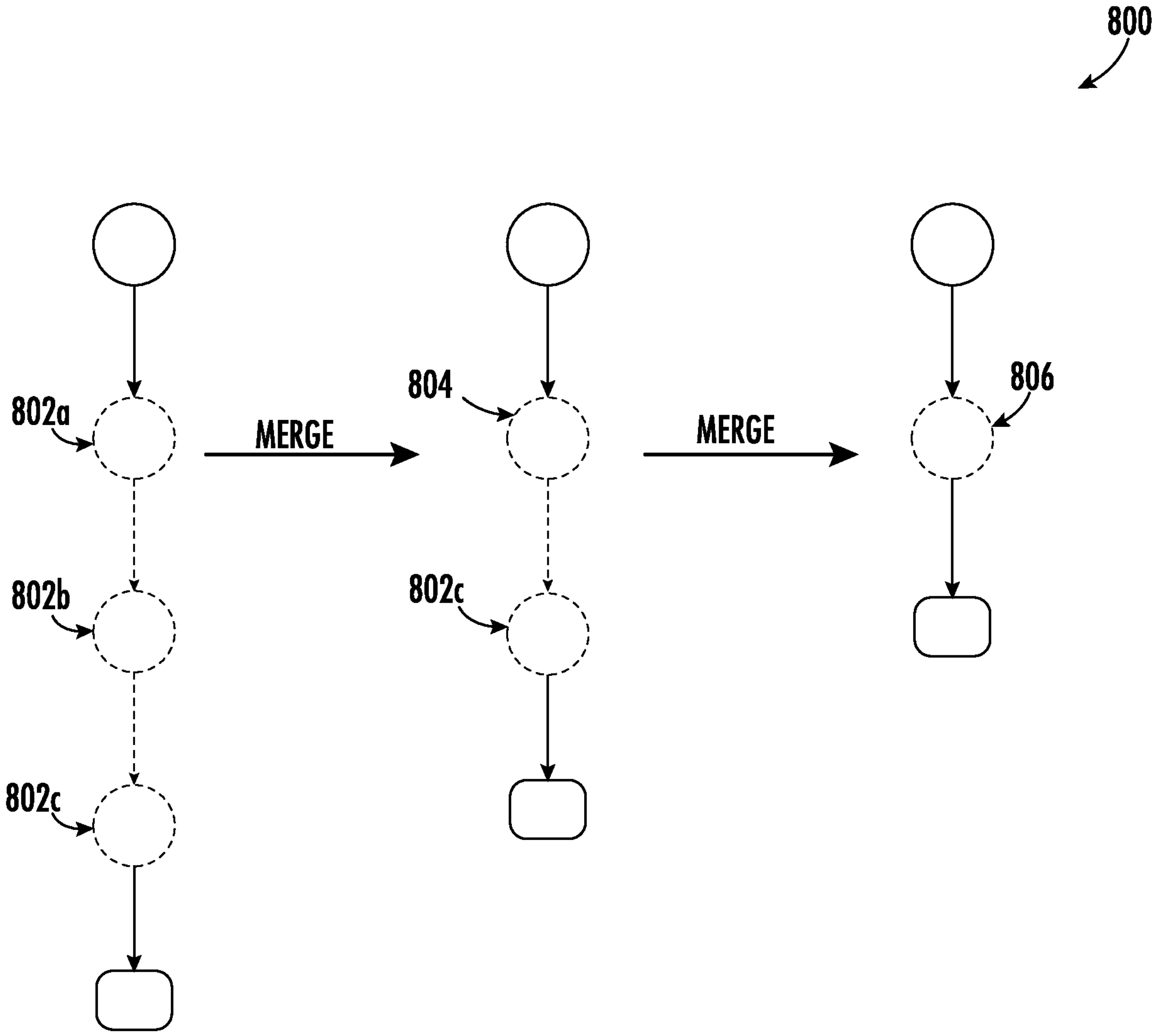
FIG. 8 illustrates an example illustration of iteratively merging "degree 2 nodes" into a single node according to the techniques herein.

FIG. 8, for instance, illustrates an example illustration 800 of iteratively merging "degree 2 nodes" into a single node according to the technique described above. For instance, three degree 2 nodes such as node 802*a*, node 802*b*, and node 802*c* may be merged by merging two of the nodes such as node 802*a* and node 802*b* into node 804, and then the node 804, which is still a degree 2 node, may be merged with node 802*c* into node 806, as shown.

Figure 9:
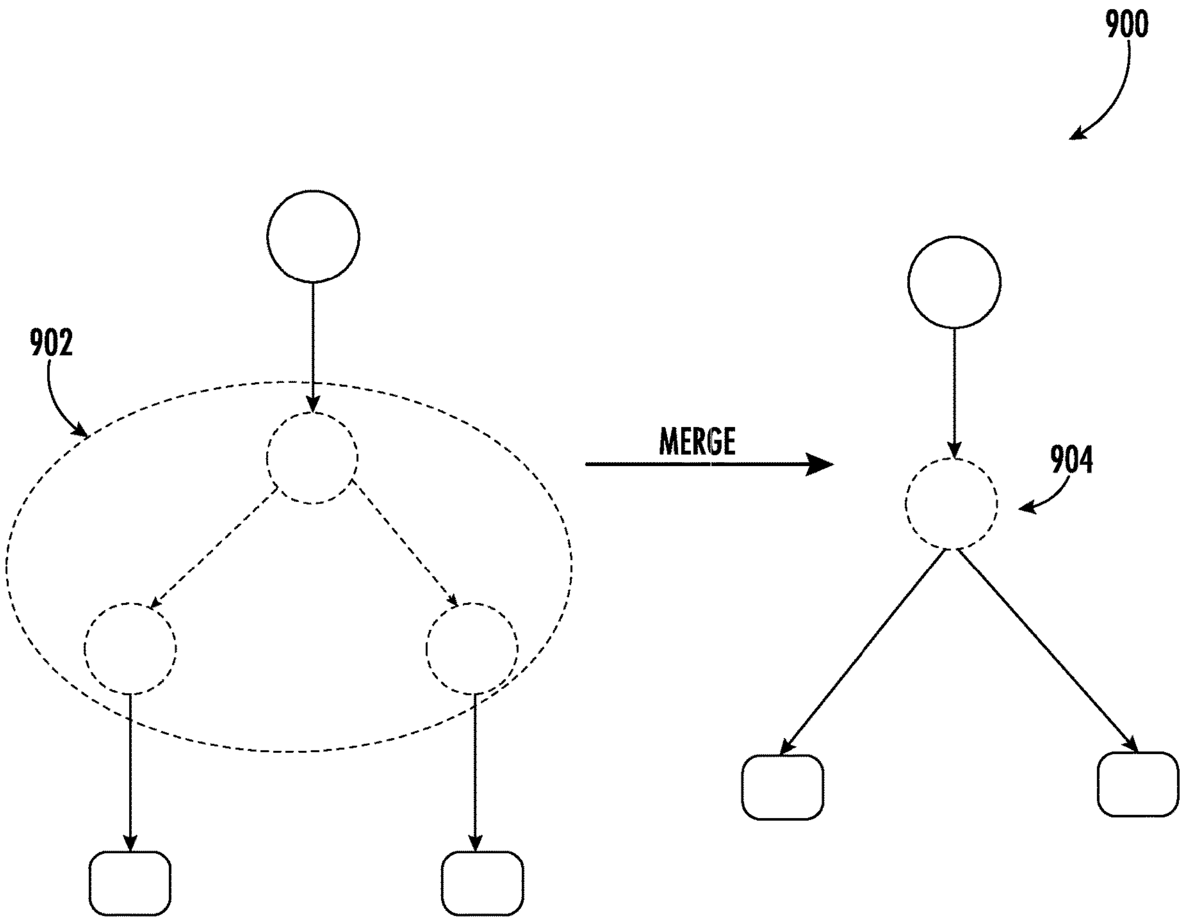
FIG. 9 illustrates an example illustration of merging a fork into a single node according to the techniques herein.

In another embodiment, a similar process can be conducted to identify forks and merge them into a single node. This allows the techniques herein to derive code that handles a first step, and then one of two possible steps depending on the outcome of the first step (e.g., check the device type for a device, and then use one of two APIs to get information, depending on whether the device is wired or wireless). FIG. 9, for instance, illustrates an example illustration 900 of merging a fork 902 into a single node 904 according to the technique described above.

In all cases, different candidates can be identified by using either only failed traces, or only successful traces. Using only successful traces is likely to lead to reliable methods that do not need much editing during review. Using only failed traces surfaces a difficult task that the model has not yet been able to achieve, and that might require a subject-matter expert to code up from scratch.

The fourth component herein is the generalized function builder 610, or "GFB". The GFB takes as input candidate groupings and evaluate them. For each grouping, it attempts to produce one or a handful functions that generalize the input functions. This can be achieved using a large language model with a prompt including the various code samples, and instructions to write up a function that generalizes all of those examples. Multiple generations can be sampled from the model, by sampling it multiple times, using a non-zero temperature or randomizing the order and selection of the code samples included in the prompt.

For each candidate output function, an automatic evaluation is carried out. The results are used to prune out candidate functions that result in execution errors, before they are proposed for expert review. The evaluation can leverage:

- Standard parameter values (e.g., for a username parameter, sample values may be known a priori).
- Real parameter values extracted from the original code in the trace, by re-running it, or getting them from the trace if such telemetry is available.

The fifth component herein is the expert review interface 612, or "ERI". The ERI displays candidate functions from the GFB for review by subject matter experts. The ERI displays rich contextual information:

- The proposed function.
- The sample runs done in the GFB, with their inputs and outputs. The values of intermediary variables in the function code can also be reported for each run to help the reviewer assess the correctness of the method.
- Optionally, the ERI may provide a method for the proposed function to be run on the fly using reviewer supplied inputs.

The reviewer can take one of the following actions:

- Accept the candidate function.
- Modify the code and description of the function to fix issues and/or improve it (e.g., by tackling additional corner cases), then accept it. During this process, the reviewer may request that the updated function is run again by the GFB before finally accepting it.
- Refuse the candidate function.

If the reviewer accepts the function, it will be added to the MD to be used in further agent runs. The trace graph is then updated to reflect the corresponding node contractions. Traces that went through the nodes that have been merged can be assigned to the merged nodes. However, that is a form of counterfactual as the original trace may not have run the exact same code as that of the generalization code in the merged node. Alternatively, a new trace can be produced by re-running the agent on the same question as used in the trace but with the new merged nodes available. Even then, the new trace is not guaranteed to behave similarly as the initial trace as the data in the API might have changed and lead to a different path being taken in the graph. However, it is a reasonable approximation in general. On the other hand, if the reviewer refuses, the sub-graph may be added temporarily to a disapproved list so that the GCE does not select it again in the near future.

Figure 10:
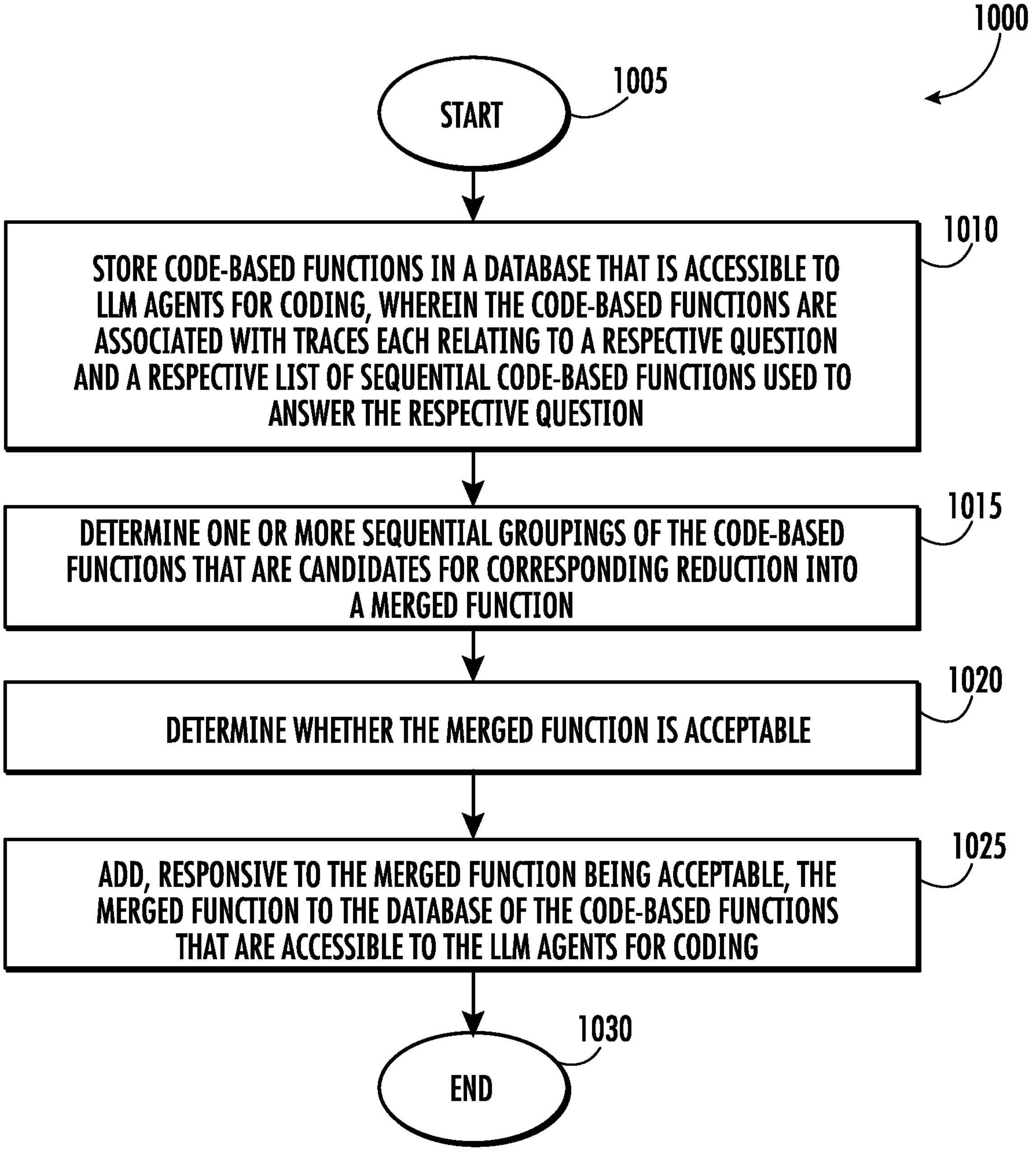
FIG. 10 illustrates an example procedure for automatic curation of reusable code snippets for LLM agents.

FIG. 10 illustrates an example simplified procedure for automatic curation of reusable code snippets for LLM agents in accordance with one or more embodiments described herein. For example, a non-generic, specifically configured device (e.g., device 200, an apparatus) may perform procedure 1000 by executing stored instructions (e.g., process 248). The procedure 1000 may start at step 1005, and continues to step 1010, where, as described in greater detail above, the techniques herein store code-based functions in a database that is accessible to large language model agents (e.g., troubleshooting agents for coding. As described above, the code-based functions are associated with traces each relating to a respective question and a respective list of sequential code-based functions used to answer the respective question by a past agent run. For instance, as detailed above, the techniques herein may build a directed graph summarizing how the code-based functions in the database have been used by the traces, where nodes of the directed graph correspond to questions, final answers to the questions, and particular code-based functions used to reach the final answers to the questions, and where edges between the nodes follow flows of past agent runs. In one implementation, the directed graph weights the edges based on a number of traces going through each edge according to the flows of the past agent runs. Also, as described above (and for use below), the techniques herein may also filter the directed graph (e.g., in general or for display) from all of the traces to just filtered traces that are either only successful traces or only failed traces, thus allowing for distinguished treatments of the filtered traces, accordingly.

In step 1015, the techniques herein may then determine one or more sequential groupings of the code-based functions that are candidates for corresponding reduction into a merged function. That is, as described above, the candidates for corresponding reduction into the merged function may comprise two trace-connected code-based functions each with exactly one inbound edge and exactly one outbound edge, or a first code-based function that forks to two or more code-based functions, where the merged function would then comprise a first step and two or more possible steps dependent on an outcome of the first step. As noted above, the techniques herein may iteratively merge the merged function with one or more other functions into a further merged function, and so on.

In certain implementations, producing the merged function itself may be based on prompting a large language model with i) the one or more sequential groupings of the code-based functions that are the candidates for corresponding reduction into the merged function and ii) instructions to the large language model to generalize, into one or more new code snippets, all of the one or more sequential groupings of the code-based functions that are the candidates for corresponding reduction into the merged function.

In step 1020, the techniques herein may determine whether the merged function is acceptable. Specifically, in certain implementations, step 1020 involves evaluating the merged function for any execution errors, and pruning the merged function responsive to having execution errors, as noted above. Additionally, in certain implementations, step 1020 further comprises displaying the merged function for reviewer review (e.g., a subject matter expert, a user, an administrator, or an automated review process). In such implementations, the techniques herein may thus receive a response from the reviewer review regarding the merged function, where the response is one of either: acceptance of the merged function, modification of the merged function for acceptance, or refusal of the merged function (e.g., to prevent future use of the merged function). To assist in the review, the techniques herein may also provide contextual information for the reviewer review, such as: the merged function, sample runs performed on the merged function with corresponding inputs and respective outputs, values of intermediate variables in the merged function, and so on. Moreover, in one implementation, the techniques herein may also provide an option for reviewer-initiated execution of the merged function with reviewer-supplied inputs, as mentioned above.

In step 1025, the techniques herein may then add, responsive to the merged function being acceptable, the merged function to the database of the code-based functions that are accessible to the large language model agents for coding. In one implementation, step 1025 involves updating the traces with the merged function such that the respective list of sequential code-based functions used to answer the respective question passes through the merged function instead of the one or more sequential groupings of the code-based functions. In alternative implementations, step 1025 involves creating a new trace for an original question by at least one of the large language model agents with the merged function available in the database.

Note that in response to refusal of the merged function, the techniques herein may either simply not add the merged function to the database, or else may specifically prevent future use of the merged function, for at least some certain configurable or determined length of time, as noted above.

Procedure 1000 may end at step 1030, with the option of further discovering additional candidates for reduction into acceptable merged functions to add to the database, accordingly.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: storing code-based functions in a database that is accessible to large language model agents for coding, wherein the code-based functions are associated with traces each relating to a respective question and a respective list of sequential code-based functions used to answer the respective question by a past agent run; determining one or more sequential groupings of the code-based functions that are candidates for corresponding reduction into a merged function; determining whether the merged function is acceptable; and adding, responsive to the merged function being acceptable, the merged function to the database of the code-based functions that are accessible to the large language model agents for coding.

In still other implementations, a tangible, non-transitory, computer-readable medium storing program instructions that cause a device to execute a process comprising: storing code-based functions in a database that is accessible to large language model agents for coding, wherein the code-based functions are associated with traces each relating to a respective question and a respective list of sequential code-based functions used to answer the respective question by a past agent run; determining one or more sequential groupings of the code-based functions that are candidates for corresponding reduction into a merged function; determining whether the merged function is acceptable; and adding, responsive to the merged function being acceptable, the merged function to the database of the code-based functions that are accessible to the large language model agents for coding.

The techniques described herein, therefore, provide for automatic curation of reusable code snippets for LLM agents (e.g., troubleshooting agents). In particular, though there are many techniques that work on building LLM agents and equipping them with tools or calling APIs either directly or by writing code through a code interpreter tool, none of these works attempt to factor out commonly occurring chunks of code into reusable blocks with the goal of increasing reliability and speed of LLM agents, as is done herein.

The techniques herein allow vendors to offer the capability to curate code snippets in a knowledge base as a service. In such a model, companies in the business of dataset and knowledge base management could provide a solution containing the techniques herein to their subscribers for them to develop custom troubleshooting documents and code snippets, in the domain of networking or in other domains of application. Such a service can be offered using either a frontend application, an API, or both. Additionally, the techniques herein may be applicable to Cross Domain Architectures (CDAs) as a set of tools allowing for a broad range of cross-domain use cases (e.g., macro-segmentation, etc.), such as for a SaaS-based controller used to support DataCenter switching networks as well as cross domain WiFi and SD-WAN implementations.

Illustratively, the techniques described herein may be performed by hardware, software, and/or firmware, (e.g., an "apparatus") such as in accordance with the code curation, process 248, e.g., a "method"), which may include computer-executable instructions executed by the processor(s)

220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method for automatically curating reusable code snippets, the method, comprising:

storing, by a device, code-based functions in a database that is accessible to large language model agents for coding, wherein the code-based functions are associated with traces for one or more past agent runs, each trace relating to a respective question and a respective list of sequential code-based functions used to answer the respective question;

determining, by the device, a set of code-based functions, from among the code-based functions, that are used in a sequence in the one or more past agent runs;

causing a large language model to be executed to cause the large language model to produce a merged function, the causing including providing i) the set of code-based functions that are used in the sequence in the one or more past agent runs and ii) an instruction to generalize, into one or more newly produced code snippets, the set of code-based functions that are used in the sequence in the one or more past agent runs;

determining, by the device, whether the merged function is acceptable; and adding, by the device and responsive to the merged function being acceptable, the merged function to the database of the code-based functions that are accessible to the large language model agents for coding.

2. The method of claim 1, wherein determining whether the merged function is acceptable comprises:

evaluating the merged function for any execution errors; and pruning the merged function responsive to having execution errors.

3. The method of claim 1, further comprising:

building a directed graph summarizing how the code-based functions in the database have been used by the traces, wherein nodes of the directed graph correspond to questions, final answers to the questions, and particular code-based functions used to reach the final answers to the questions, and wherein edges between the nodes follow flows of the one or more past agent runs.

4. The method of claim 3, further comprising:

weighting the edges based on a number of traces going through each edge according to the flows of the one or more past agent runs.

5. The method of claim 3, further comprising:

filtering the directed graph from the traces to filtered traces that are either successful traces or failed traces for distinguished treatments of the filtered traces.

6. The method of claim 1, further comprising:

displaying the merged function for reviewer review; and receiving a response from the reviewer review regarding the merged function, the response being one of: acceptance of the merged function, modification of the merged function for acceptance, or refusal of the merged function to prevent future use of the merged function.

7. The method of claim 6, further comprising:

providing contextual information for the reviewer review selected from a group consisting of: the merged function; sample runs performed on the merged function with corresponding inputs and respective outputs; and values of intermediate variables in the merged function.

8. The method of claim 6, further comprising:

providing an option for reviewer-initiated execution of the merged function with reviewer-supplied inputs.

9. The method of claim 1, further comprising:

updating the traces, responsive to the merged function being acceptable, with the merged function such that the respective list of sequential code-based functions used to answer the respective question passes through the merged function instead of the set of code-based functions.

10. The method of claim 1, further comprising:

creating, responsive to the merged function being acceptable, a new trace for an original question by at least one of the large language model agents with the merged function available in the database.

11. The method of claim 1, wherein the set of code-based functions comprise two trace-connected code-based functions each associated with a single inbound edge and a single outbound edge in a directed graph representation.

12. The method of claim 1, wherein the set of code-based functions comprise a first code-based function that forks to two or more code-based functions, wherein the merged function comprises a first step and two or more possible steps dependent on an outcome of the first step.

13. The method of claim 1, further comprising:

iteratively merging the merged function with one or more other functions into a further merged function.

14. The method of claim 1, wherein the large language model agents comprise troubleshooting agents.

15. An apparatus, comprising:

one or more network interfaces to communicate with a network;

a processor coupled to the one or more network interfaces; and a memory configured to store instructions that, when executed by the processor, cause the processor to perform a process comprising:

storing code-based functions in a database that is accessible to large language model agents, wherein the code-based functions are associated with traces for one or more past agent runs, each trace relating to a respective question and a respective list of sequential code-based functions used to answer the respective question;

determining a set of code-based functions, from among the code-based functions, that are used in a sequence in the one or more past agent runs;

causing a large language model to be executed to produce a merged function, the causing including providing i) the set of code-based functions that are used in the sequence in the one or more past agent runs and ii) an instruction to generalize, into one or more newly produced code snippets, the set of code-based functions that are used in the sequence in the one or more past agent runs;

determining whether the merged function is acceptable; and adding, responsive to the merged function being acceptable, the merged function to the database of the code-based functions that are accessible to the large language model agents.

16. The apparatus of claim 15, wherein determining whether the merged function is acceptable comprises:

evaluating the merged function for any execution errors; and pruning the merged function responsive to having execution errors.

17. The apparatus of claim 15, the process further comprising:

building a directed graph summarizing how the code-based functions in the database have been used by the traces, wherein nodes of the directed graph correspond to questions, final answers to the questions, and particular code-based functions used to reach the final answers to the questions, and wherein edges between the nodes follow flows of the one or more past agent runs.

18. The apparatus of claim 15, the process further comprising:

displaying the merged function for reviewer review; and receiving a response from the reviewer review regarding the merged function, the response being one of: acceptance of the merged function, modification of the merged function for acceptance, or refusal of the merged function to prevent future use of the merged function.

19. A tangible, non-transitory, computer-readable medium storing program instructions that cause a device to execute a process comprising:

storing code-based functions in a database that is accessible to large language model agents, wherein the code-based functions are associated with traces for one or more past agent runs, trace each relating to a respective question and a respective list of sequential code-based functions used to answer the respective question;

determining a set of code-based functions, from among the code-based functions, that are used in a sequence in the one or more past agent runs;

causing a large language model to be executed to produce a merged function, the causing including providing i) the set of code-based functions that are used in the sequence in the one or more past agent runs and ii) an instruction to generalize, into one or more newly produced code snippets, the set of code-based functions that are used in the sequence in the one or more past agent runs;

determining whether the merged function is acceptable; and adding, responsive to the merged function being acceptable, the merged function to the database of the code-based functions that are accessible to the large language model agents.

* * * * *